United States Patent [19]

Garascia

[11] 4,206,927
[45] Jun. 10, 1980

[54] GASKET FOR VEHICLE LAMP

[75] Inventor: David C. Garascia, Novi, Mich.

[73] Assignee: American Sunroof Corporation, Southgate, Mich.

[21] Appl. No.: 947,009

[22] Filed: Sep. 29, 1978

[51] Int. Cl.² .............................................. F16J 15/06
[52] U.S. Cl. ..................... 277/12; 277/233; 428/315; 362/83
[58] Field of Search ................. 277/166, 12, 227, 228, 277/233, 125; 428/315; 296/93; 362/83

[56] References Cited

U.S. PATENT DOCUMENTS

| 524,162 | 8/1894 | Cochrane | 277/233 |
|---|---|---|---|
| 2,786,935 | 3/1957 | Geary | 362/83 |
| 2,824,753 | 2/1958 | La Voie | 362/83 X |
| 3,039,780 | 6/1962 | Nordell | 277/125 |
| 3,273,743 | 9/1966 | McColl | 277/233 X |
| 3,531,367 | 9/1970 | Karsten | 428/315 |
| 3,582,095 | 6/1971 | du Dyck | 277/233 |
| 3,616,029 | 10/1971 | Lerman | 428/315 X |
| 3,856,614 | 12/1974 | Susuki et al. | 428/315 X |
| 4,020,207 | 4/1977 | Alfter et al. | 428/315 X |

FOREIGN PATENT DOCUMENTS

| 1035497 | 7/1958 | Fed. Rep. of Germany | 362/83 |
| 1362035 | 4/1964 | France | 428/315 |
| 1051226 | 12/1966 | United Kingdom | 277/227 |

Primary Examiner—Robert S. Ward, Jr.
Attorney, Agent, or Firm—Basile and Weintraub

[57] ABSTRACT

A gasketing material or gasket is defined by a synthetic resinous elastomer core sandwiched between opposed cellular surfaces. The core imparts structural rigidity and integrity to the opposed cellular surfaces. The cellular surfaces are bonded or otherwise adhered to the elastomeric core. The gasket is utilized, in a preferred manner, about the periphery of a vehicle trim lamp.

5 Claims, 5 Drawing Figures

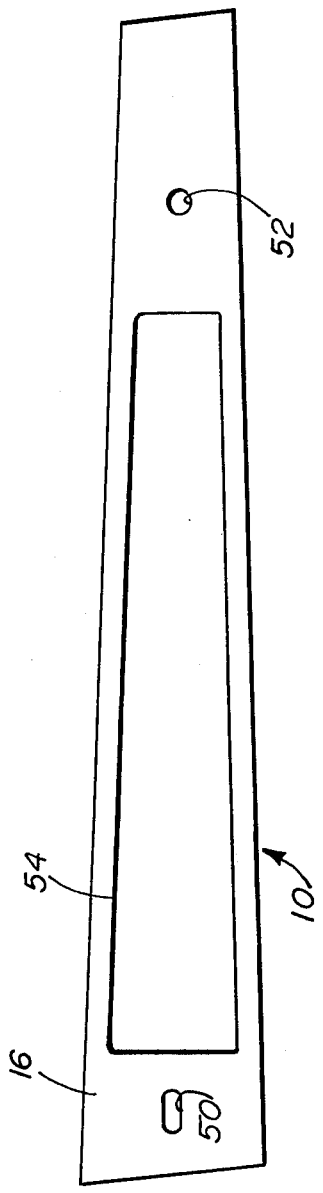
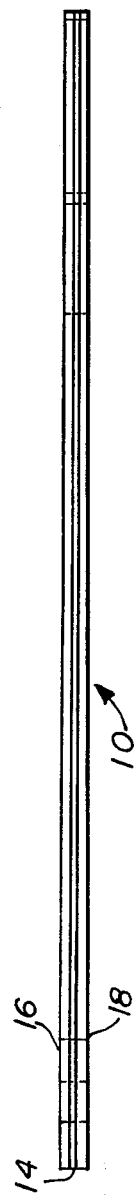
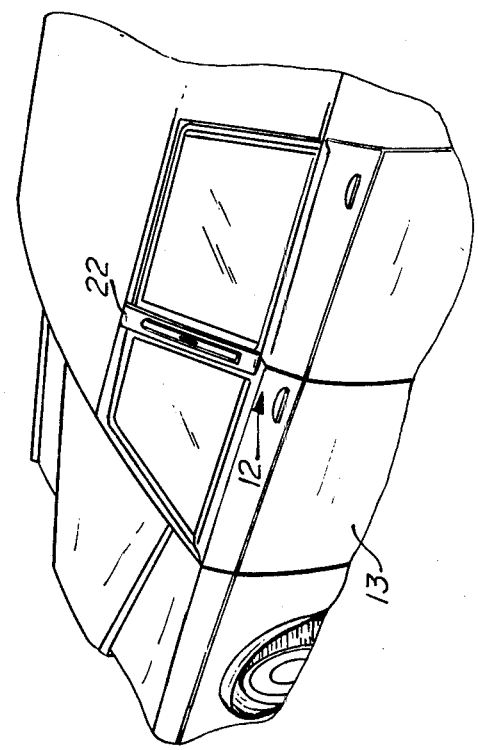

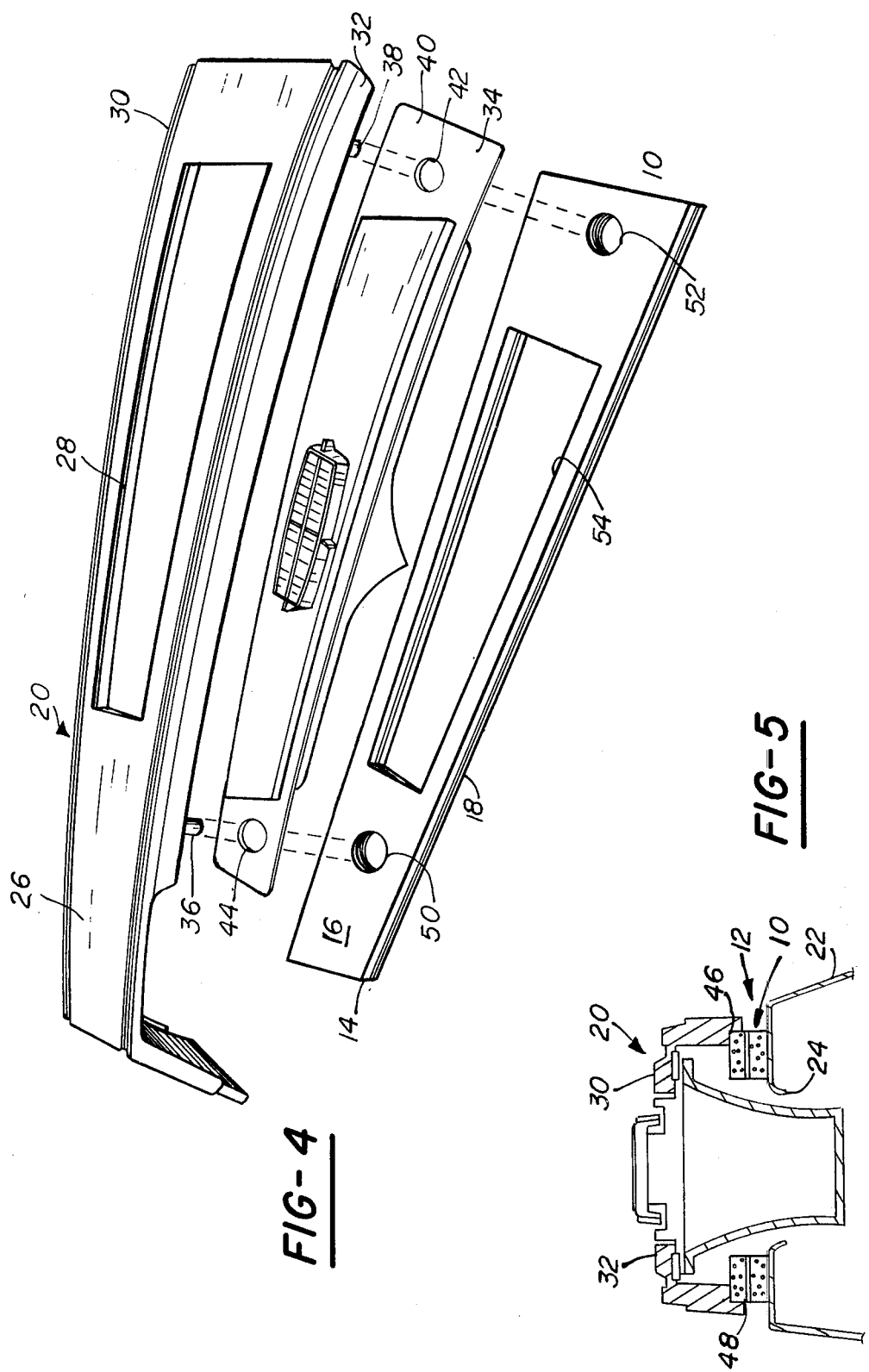

GASKET FOR VEHICLE LAMP

BACKGROUND OF THE INVENTION

I. Field of the Invention

The present invention pertains to gaskets. More particularly, the present invention pertains to gaskets for vehicular use. Even more particularly, the present invention concerns gaskets for vehicle trim lamps.

II. Prior Art

There has been disclosed heretofore a plurality of gaskets and gasketing materials for utilization and deployment in countless environments. Ordinarily, such gaskets are utilized to provide a mating seal between normally non-sealing surfaces. One of the more common environments where a plurality of gaskets are utilized is in an automobile. There are gaskets existing around the crank case, the doors and other components. One of the more commonplace areas where gasketing is utilized is associated with the trim lamps of the vehicle. A seal must be effectuated between the lamp and the body of the vehicle to preclude moisture from entering therein and, thus, shorting out the wires leading to the lamp; corroding the areas around the lamp and otherwise damaging same. Usually, normal installations of trim lamps requires undue time and the like. Normal gasketing or gasket material is merely a cellular component which must be sandwiched between the mating surfaces. Because of the cellular structure it is extremely difficult to work with. Thus, much operator time is required in order to properly implace the gasket material. Furthermore, the sandwiching of the gasket material between the mating surfaces causes a lateral expansion thereof which, oftentimes, results in the gasketing material being visible about the periphery of the mating surface thereby providing an unsightly appearance.

The present invention, as will subsequently be detailed, overcomes these deficiencies in the prior art by providing an improved gasket which completely overcomes the deficiencies noted in the prior art.

STATEMENT OF RELEVANT ART

To the best of applicant's knowledge there does not exist a gasket material of the type under consideration herein.

SUMMARY OF THE INVENTION

In accordance with the present invention, there is provided a gasket which generally comprises an elastomeric core sandwiched between a pair of opposed cellular surfaces. The core is formed from any suitable elastomeric material such as polyethylene, polypropylene, hexamethylene adipamide, polyurethane or the like. The cellular outer surfaces are, preferably formed from a polyurethane material such as a polyether polyurethane or a polyester polyurethane. The cellular materials are open celled compressible bodies which are bonded or otherwise adhered to the core.

The gasket hereof is particularly amenable in mounting decorative automotive trim lamps to the body of an automotive vehicle.

For a more complete understanding of the present invention, reference is made to the following detailed description and accompanying drawing. In the drawing, like reference characters refer to like parts throughout the several views in which:

BRIEF DESCRIPTION OF THE DRAWING

FIG. 1 is a broken, perspective view of a vehicle having a trim lamp incorporated therewith which incorporates and adopts the gasket of the present invention;

FIG. 2 is a plan view of a gasket in accordance with the present invention;

FIG. 3 is a side elevational view of the gasket hereof;

FIG. 4 is an exploded, perspective view of a trim lamp utilizing the gasket hereof, and FIG. 5 is cross-sectional view of the trim lamp of FIG. 4.

DESCRIPTION OF THE PREFERRED EMBODIMENT

Now, and with reference to the drawing, and in particular FIGS. 1-3, there is depicted therein a gasket generally denoted at 10 and which is particularly adapted for utilization with an automotive trim lamp generally denoted at 12. As is known to those skilled in the art to which the present invention pertains, trim lamps are accessories which are affixed to the exterior of an automotive vehicle body 14 such as at the pillar; on the roof; as well as being mounted to the fenders and the like. They are generally exterior lights which are deployed not only for aesthetic purposes but to enhance vehicle visibility as well. Furthermore, as is known to the skilled artisan such lamps are mounted into openings formed in the vehicle body and are sealingly mounted thereto by a heretofore conventional gasketing.

Referring again to the drawing, and in accordance with the present invention there is provided a gasket 10 as above noted. The gasket 10 hereof generally comprises a core 14 which is sandwiched between a pair of opposed cellular bodies 16, 18 respectively. The bodies 16, 18 are adhered to the core 14 by any suitable mode such as by bonding, adhesives or the like. The gasket 10 hereof employs the opposed cellular surfaces and the central core as a laminar structure. This laminar structure overcomes the deficiencies heretofore encountered with a substantially one hundred percent (100%) cellular gasket or a one hundred percent (100%) elastomeric or solid flexible gasket. It has been found that by providing a gasket having an elastomeric core, which is flexible, and cellular outer bodies which are compressible, that there is defined thereby a gasket having structural rigidity with the requisite ability to fill gaps, and which is incorporated into a unitary structure.

It has been found that by the practice of the present invention, there is an increased ease of assembly while contemporanously eliminating the unsightly expulsion of gasket around the perimeter of the mating parts at the point of junction therebetween. In addition, the present gasket increases the ease of packaging; reduces the damage during shipment of parts; reduces storage damage and reduces scrap. Furthermore, because of the rigidity imparted by the elastomeric core there is stability in the gasket which facilitates assembly. Hence, there is an increased reduction in design cost by the elimination of the time consuming effort required to make provisions in a part to be sealed with conventional gaskets. Hence, the present gasket provides untold advantages over heretofore known gaskets.

The core 14 is formed from any suitable elastomeric flexible material such as polyethylene, polypropylene, hexamethylene adipamide or the like. These elastomers are cast by any suitable mode well known to the skilled artisan. Preferably, the core comprises a cast polyurethane elastomer. Such polyurethane elastomers are well known in the art. The only requirement to be attached hereto is that the elastomer be a substantially solid material having sufficient flexibility to enable it to be adapted for use herein.

Bonded or otherwise adhered to the opposite surfaces of the core are the cellular bodies 16, 18. Optimally, the bodies 16, 18 are, each, open-celled bodies which are compressible, non-friable and substantially weather resistant. In a preferred embodiment hereof the cellular bodies are polyurethane foam bodies which are bonded to the polyurethane core. Again, such polyurethane foams are well known in the art. The only criteria to be attached hereto is that they be cellular foam structures capable of withstanding weather climatic conditions. Hence, the polyurethane can be a polyether polyurethane, a polyester polyurethane or any combination thereof.

By virtue of the solid core, the gasketing material hereof can be machined or otherwise can be subjected to mechanical processes such as drilling and cutting operations. Concomitantly, because of the flexibility and compressibility of the foam bodies or surfaces, the gasket hereof is able to take up gaps and disparities between mating surfaces. Hence, the stability of facility of use of the present gasket are apparent.

As hereinbefore noted the present invention is particularly amenable for utilization as a gasket for trim lamps for automotive vehicles.

Referring, in particular, to FIGS. 2, 3, 4 and 5 there is depicted therein a trim lamp and gasket assembly in accordance with the present invention.

In accordance herewith there is provided a trim lamp assembly, generally, denoted at 20 and which is adapted to be mounted to the vehicle body 13 and such as at the pillar 22 thereof. Ordinarily, an opening 24 is provided in the pillar 22 and through which the lamp assembly 20 is mountable.

The lamp assembly comprises a decorative outer molding 26 of any suitable configuration. The molding 26 generally has a length substantially equal to that of the roof pillar. The molding has an opening 28 formed therein through which the lamp, per se, projects. The molding may be provided with a pair of opposed walls 30, 32 in which the lamp assembly 34 nests and is snugly retained therewithin.

A pair of spaced apart mounting posts 36 and 38 project outwardly from the interior surface of the molding 26. The mounting posts are employed to mount the lamp 34 and the gasket 10 to the vehicle. The free end of the post 36 or 38 receives a fastening means such as a nut, rivet, or fixed cap (not shown) to permanently mount the assembly to the vehicle. As noted, the molding 26 is provided with any aesthetic appearance, as desired, in order to enhance the appeal.

The lamp assembly 34 is of any suitable construction. Generally, such lamps comprise a bulb or other luminescent wire, optical fiber, or the like which is an electrical communication with a source of electrical energy such as the battery or the like. Ordinarily, a switch, such as the headlamp switch or the like is interposed the power source and the illuminating member to control the lighting thereof. The lamp includes a support frame 40 having a pair of spaced apart openings 42 and 44 through which the posts 38 and 36 project, respectively.

As clearly shown in FIG. 5, the lamp 34 is encased within a housing which nests within the width of the molding 26. The sidewalls 30 and 32 of the molding each have a shoulder 46, 48 respectively formed at the free end thereof. The shoulder is used to define a seat for the gasket 10.

Ordinarily, and as is known to the skilled artisan, the molding would be mounted to the pillar 22 with a gasketing material being interposed therebetween. This would entail a cumbersome job because of the cellular nature of the gasket which could result in the exuding of the gasket or the like. Again, the gasketing is important in order to effecuate a seal between the molding and the vehicle body 13 at the pillar. This prevents moisture from entering into the opening 24. Hence, and in accordance herewith, the gasket 10 hereof is mounted to the vehicle at the pillar 22 and has the first or upper body 16 seat within the shoulder 46 and 48. The lower body 18 normally rests against the body 13. Thus, the gasket 10 hereof defines a seal between the molding 26 and the vehicle body 13 about the opening 24. Because of the construction of the present gasket, the gasket is provided with a pair of spaced apart openings 50, 52 through which projects the mounting posts 36, 38 respectively. The gasket is provided with a cutout section 54 which fits about the lamp housing 40. Hence, the lamp is sealed thereabout via the gasketing. It is to be noted in this regard that it is the utilization of the elastomeric solid core which enables the machining of the gasket, per se, to easily have the openings 50 and 52 as well as the cutout section 54 easily formed therewithin thereby rendering the gasket hereof extremely efficacious.

It is to be further noted with respect hereto that the actual construction of the lamp 34 is not critical hereto and does not form part of the present invention per se. Rather, it is the construction of the gasket and its utilization which is critical hereto. In this regard it is to be noted that upon compression of the gasket, the cellular nature thereof enables the filling of discontinuities or gaps to promote sealing.

It is to be appreciated from the preceding that there has been described herein a gasket of increased efficiency and efficacy and which is particularly amenable for facilitating installation of automotive trim lamps.

It is apparent that many modifications and changes can be made to the present invention without departing from the spirit and scope thereof. All such modifications are intended to be within the scope and ambit hereof.

Having, thus, described the invention what is claimed is:

1. In combination with an automotive vehicle lamp assembly of the type mounted in an exterior opening formed in the automotive body, a sealing gasket therefor, comprising:
    (a) a solid central core having first and second exposed surfaces,
    (b) a first cellular body adhered to the first surface, and
    (c) a second cellular body adhered to the second surface.

2. The combination of claim 1 wherein the gasket has at least one opening formed therethrough, the opening defining means for receiving a vehicle lamp mounting post.

3. The gasket of claim 1 wherein the core comprises a solid, flexible elastomeric body.

4. The gasket of claim 1 wherein each cellular body comprises an open-celled synthetic resinous body.

5. The gasket of claim 1 wherein:
    (a) the core comprises a solid, flexible polyurethane elastomer, and
    (b) each cellular body comprises a polyurethane, open-cell foam.

* * * * *